(12) United States Patent
Raghav et al.

(10) Patent No.: US 8,548,141 B2
(45) Date of Patent: *Oct. 1, 2013

(54) TECHNIQUES FOR TRANSFER ERROR RECOVERY

(75) Inventors: Amritansh Raghav, Seattle, WA (US);
Michael Trommsdorff, Zurich (CH);
Rajesh Ramanathan, Redmond, WA (US); Andreas Strebel, Staufen (CH)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/606,664

(22) Filed: Sep. 7, 2012

(65) Prior Publication Data

US 2012/0328084 A1 Dec. 27, 2012

Related U.S. Application Data

(63) Continuation of application No. 12/027,277, filed on Feb. 7, 2008, now Pat. No. 8,265,248.

(51) Int. Cl.
*H04M 1/56* (2006.01)
*H04M 3/42* (2006.01)
*H04M 3/00* (2006.01)

(52) U.S. Cl.
USPC ............. 379/142.07; 379/212.01; 379/265.02

(58) Field of Classification Search
USPC ............. 379/142.01, 142.07, 211.02, 212.01, 379/214.01, 265.01, 265.11, 266.1
See application file for complete search history.

(56) References Cited

U.S. PATENT DOCUMENTS

| | | | |
|---|---|---|---|
| 4,658,416 | A | 4/1987 | Tanaka |
| 5,943,415 | A | 8/1999 | Tatebayashi |
| 5,946,296 | A | 8/1999 | Kim et al. |
| 6,026,155 | A | 2/2000 | Takeuchi et al. |
| 6,724,755 | B1 | 4/2004 | Kim |
| 7,197,133 | B2 | 3/2007 | Cook et al. |
| 7,292,684 | B2 | 11/2007 | Kuorsaki |

(Continued)

FOREIGN PATENT DOCUMENTS

| | | |
|---|---|---|
| EP | 0255325 B1 | 2/1993 |
| JP | 200766133 A | 3/2007 |
| KR | 1020050097356 A | 10/2005 |

OTHER PUBLICATIONS

"SIP Toolkit" (2006), pp. 1-4, http://web.archive.org/web/20060710021153/http://www.radvision.com/NR/rdonlyres/257627C9-770F-4C3C-8A90-6BC76146BFC0/0/SIP_Toolkit_Brochure_200601.pdf.

(Continued)

*Primary Examiner* — Quoc D Tran (57) ABSTRACT

Techniques for transfer error recovery are described. A system may comprise a context generator module operative to record context information for a first call session between a first call terminal and a call system resource, and store the context information with a context identifier in a context table. The system may include a transfer error context module to couple to the context generator module, the transfer error context module operative to generate transfer error context information having the context identifier. The system may include a call transfer module to couple to the transfer error context module, the call transfer module operative to send the transfer error context information to the first call terminal for use in case of a transfer failure event. Other embodiments are described and claimed.

20 Claims, 8 Drawing Sheets

(56) References Cited

U.S. PATENT DOCUMENTS

| | | |
|---|---|---|
| 7,555,110 B2 | 6/2009 | Dolan et al. |
| 7,751,546 B2 | 7/2010 | Poustchi et al. |
| 7,965,829 B2 | 6/2011 | Crockett et al. |
| 8,265,248 B2 * | 9/2012 | Raghav et al. ........... 379/142.07 |
| 2004/0264659 A1 | 12/2004 | Kurosaki |
| 2005/0188273 A1 | 8/2005 | Angelo |
| 2006/0146798 A1 | 7/2006 | Harton et al. |
| 2006/0203993 A1 | 9/2006 | Busey et al. |
| 2006/0227957 A1 | 10/2006 | Dolan et al. |
| 2007/0047716 A1 | 3/2007 | Crockett et al. |
| 2007/0116234 A1 | 5/2007 | Schneider et al. |
| 2007/0282990 A1 | 12/2007 | Kumar |

OTHER PUBLICATIONS

Singh, et al., "Peer-to-Peer Internet Telephony using SIP", Tech. Rep. CUCS-044-04 (Oct. 2004), pp. 1-19, Department of Computer Science, Columbia University, New York, NY.

Sparks R., "SIP Call Control—Transfer", (Jul. 18, 2001), pp. 1-17.

International Search Report for PCT/US2009/031370, mailed Jun. 29, 2009, 3 pages.

* cited by examiner

RECORD CONTEXT INFORMATION FOR A FIRST CALL SESSION WITH A FIRST CALL TERMINAL
*402*

STORE THE CONTEXT INFORMATION WITH A CONTEXT IDENTIFIER
*404*

GENERATE TRANSFER ERROR CONTEXT INFORMATION HAVING THE CONTEXT IDENTIFIER
*406*

SEND THE TRANSFER ERROR CONTEXT INFORMATION TO THE FIRST CALL TERMINAL FOR USE IN CASE OF A TRANSFER FAILURE EVENT
*408*

TECHNIQUES FOR TRANSFER ERROR RECOVERY

CROSS-REFERENCE OF RELATED APPLICATIONS

This application claims the benefit of, and priority to, previously filed U.S. patent application Ser. No. 12/027,277 entitled "Techniques For Transfer Error Recovery" filed on Feb. 7, 2008, the subject matter of which is hereby incorporated by reference in its entirety.

BACKGROUND

In telephony, an Automatic Call Distributor (ACD) is a device or system that distributes incoming calls to a specific group of terminals for call center agents. It is often part of a computer telephony integration (CTI) system.

Routing incoming calls is the task of the ACD system. ACD systems are often found in offices that handle large volumes of incoming phone calls from callers who have no need to talk to a specific person but who require assistance from any of multiple persons (e.g., customer service representatives) at the earliest opportunity.

An ACD system typically comprises hardware for the terminals and switches, phone lines, and software for the routing strategy. The routing strategy is a rule-based set of instructions that tells the ACD how calls are handled inside the system. Typically this is an algorithm that determines the best available employee or employees to respond to a given incoming call. To help make this match, additional data are solicited and reviewed to find out why the customer is calling. Sometimes the ACD system uses the caller identification (CID) or automatic numbering identification (ANI) of the caller. In many cases, the ACD system uses an interactive voice response (IVR) system to ascertain the reason for the call.

The automated convenience of an ACD system can dramatically reduce costs for a company or enterprise since it reduces the need for human intervention. The algorithmic approach to handling a customer, however, may risk customer service when limitations of the routing strategy fail to produce a desired result sought by the customer. Consequently, improvements in ACD systems and its underlying technologies may result in improved customer service and customer satisfaction.

SUMMARY

Various embodiments may be generally directed to communications systems. Some embodiments may be particularly directed to communications systems such as call centers having an ACD system to automatically route incoming calls to a select group of call terminals. The ACD system may utilize various transfer error recovery techniques implemented as part of a transfer error context (TEC) component to reduce transfer errors when an external call terminal is transferred to the various internal call terminals serviced by the ACD system.

In one embodiment, for example, an ACD system may include a context generator module, a TEC module, and a call transfer module. The context generator module is operative to record context information for a first call session between a first call terminal and a call system resource, and store the context information with a context identifier in a context table. The TEC module is operative to generate TEC information having the context identifier. The call transfer module is operative to send the TEC information to the first call terminal for use in case of a transfer failure event. Other embodiments are described and claimed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Various embodiments may include multiple interconnected structures arranged to perform certain independent or dependent operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments are directed to techniques for transfer error recovery for an automated call system. Automated call systems, such as an ACD system, typically need to transfer incoming calls from external call terminals to various internal call terminals serviced by the ACD system, such as for customer service operations, for example. The transfer error recovery techniques allow an ACD system to recover from a transfer failure event. A transfer failure event comprises an event where a call transfer is not completed to a target call terminal. Examples of transfer failure events may include without limitation a busy signal from the target call terminal, failure of the target call terminal to complete a call connection, completing a call connection with the target call terminal and reaching voice mail or a unified messaging system, completing a call connection with an unintended call terminal, and so forth.

The transfer error recovery techniques allow the ACD system and the transferred call terminal to recover from the transfer failure event in a manner that reduces complexity of the ACD system. The transfer error recovery techniques also reduce or eliminate the need for an operator of the transferred call terminal to restart the entire call process with the ACD system. As a result, the transfer error recovery techniques can improve affordability, scalability, modularity, or extendibility for an operator, device or network.

Figure 1:
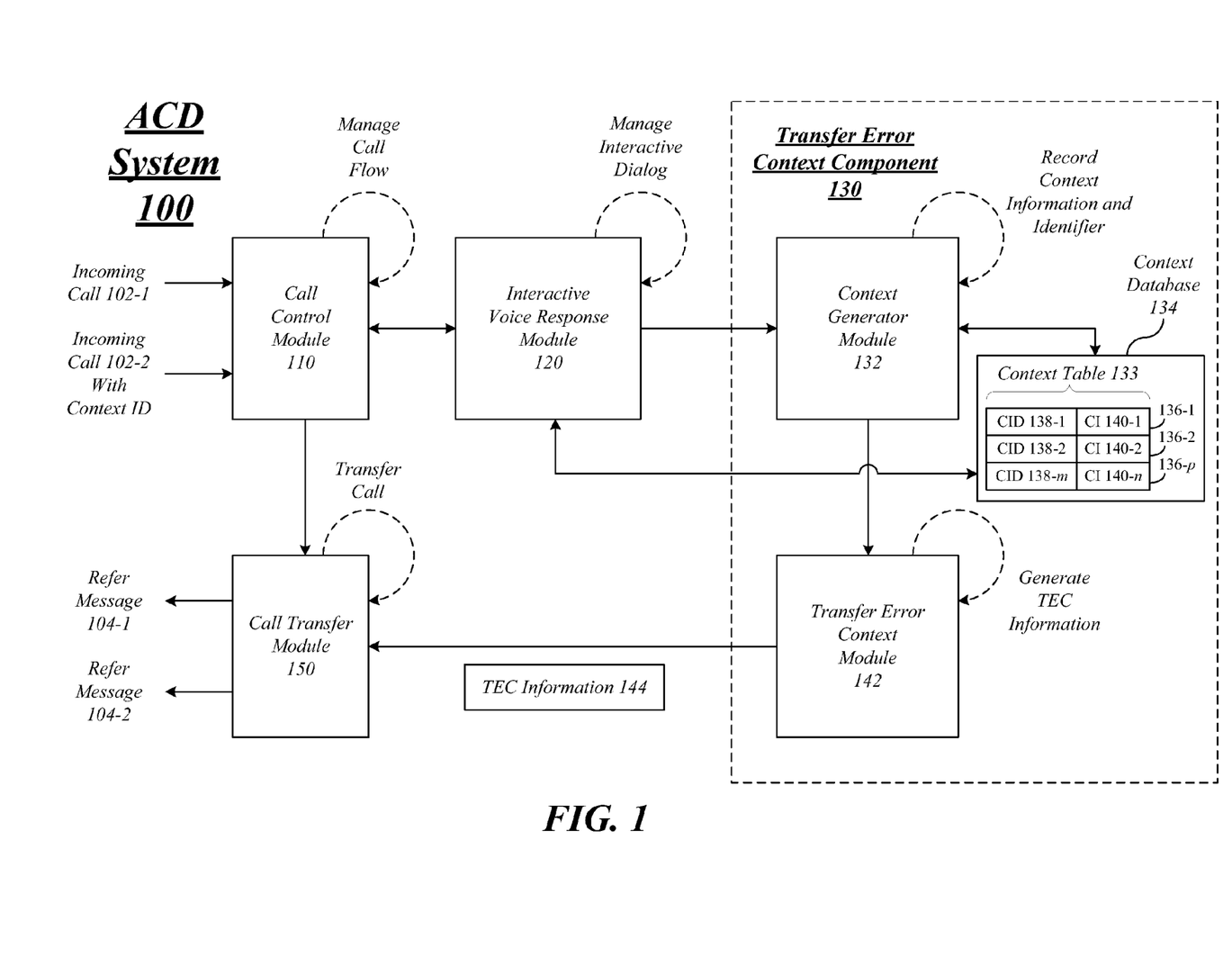
FIG. 1 illustrates one embodiment of an ACD system.

FIG. 1 illustrates a block diagram of an ACD system 100. The ACD system 100 may distribute incoming calls to a specific group of terminals for call center agents. It is often implemented as part of a CTI system. For example, the ACD system 100 may comprise part of a CTI system for a call center servicing a company or enterprise.

In various embodiments, the ACD system 100 may include various components, devices or systems capable of originating or terminating calls between various types of networks, such as a packet-switched network and/or a circuit-switched network. In the former case, the ACD system may establish a Voice Over Internet Protocol (VoIP) call using one or more VoIP signaling protocols as defined and promulgated by the Internet Engineering Task Force (IETF) standards organization, such as the Session Initiation Protocol (SIP) as defined by the IETF series RFC 3261, 3265, 3853, 4320 and progeny, revisions and variants. In general, the SIP signaling protocol is an application-layer control and/or signaling protocol for creating, modifying, and terminating sessions with one or more participants. These sessions include Internet Protocol (IP) telephone calls, multimedia distribution, and multimedia conferences. Furthermore, the VoIP call may be established using a data or media format protocol, such as the Real-time Transport Protocol (RTP) and Real-time Transport Control Protocol (RTCP) as defined by the IETF RFC 3550 and progeny, revisions and variants. The RTP/RTCP standard defines a uniform or standardized packet format for delivering multimedia information (e.g., audio and video) over a packet-switched network. Although some embodiments may utilize the SIP and RTP/RTCP protocols by way of example and not limitation, it may be appreciated that other VoIP protocols may also be used as desired for a given implementation.

In addition to the general VoIP protocols described above, the ACD system 100 may specifically implement various call transfer protocols, such as the IETF RFC 3515 titled "The Session Initiation Protocol (SIP) Refer Method," April 2003 (the "SIP Refer Specification"), as well as its progeny, revisions and variants. The SIP Refer Specification is a SIP extension that requests that the recipient REFER to a resource provided in the request. It provides a mechanism allowing the party sending the REFER to be notified of the outcome of the referenced request. This can be used to enable many applications, including call transfer. Although some embodiments refer to the SIP Refer Specification by way of example and not limitation, the transfer error recovery techniques may be applied to other transfer mechanisms or techniques as well.

In the illustrated embodiments shown in FIG. 1, the ACD system 100 comprises portions of an ACD system, including a call control module 110 communicatively coupled to external call terminals and an IVR module 120. The IVR module 120 may be communicatively coupled to a TEC component 130. The IVR module 120 and the TEC component 130 may be communicatively coupled to a context database 134. The TEC component 130 comprises a context generator module 132 communicatively coupled to a TEC module 142. The TEC component 130 may be communicatively coupled to a call transfer module 150. The call transfer module 150 may be communicatively coupled to the call control module 110, and the external call terminals coupled to the call control module 110.

Although the illustrated embodiment of the ACD system 100 as shown in FIG. 1 contains certain elements arranged in a certain topology, it may be appreciated that the ACD system 100 may include more or less elements arranged in different topologies and still fall within the scope of the embodiments. Furthermore, the various elements of the ACD system 100 may be coupled by various signal lines that may be used to exchange information to coordinate operations between each other. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The ACD system 100 may include the call control module 110. The call control module 110 may be generally arranged to manage call flow operations for the ACD system 100. In telephony, call control refers to the software within a telephone switch that supplies its central function. The call control module 110 decodes addressing information and routes telephone calls from one end point to another. It also creates the features that can be used to adapt standard switch operation to the needs of users. Common examples of such features are call transfer, call waiting, call forwarding, do not disturb, and so forth.

The ACD system 100 may include the IVR module 120. The IVR module 120 may comprise a call system resource generally arranged to manage an interactive dialog between a caller and a machine interface. In telephony, IVR refers to a phone technology that allows a computer to detect voice and touch tones using a normal phone call. The IVR module 120 can respond with pre-recorded or dynamically generated audio to further direct callers on how to proceed. The IVR module 120 can be used to control almost any function where the interface can be broken down into a series of simple menu choices. A caller dials a telephone number that is answered by the IVR module 120. The IVR module 120 executes an application which is tied to the dialed number information service (DNIS). As part of the application, prerecorded audio files or dynamically generated Text to Speech (TTS) audio explain the options available to the caller. The caller is given the choice to select options using dual-tone multi-frequency (DTMF) tones or spoken words. Speech recognition is normally used to carry out more complex transactions and simplifies the application menu structure.

The ACD system 100 may include the call transfer module 150. The call transfer module 150 may be generally arranged to manage call transfer operations for the ACD system 100. Although shown as a separate module, it may be appreciated that the operations, functions or services provided by the call transfer module 150 may be implemented as an integrated part of the call control module 110. The embodiments are not limited in this context.

A call transfer is a telecommunications mechanism that enables a user to relocate an existing call to another telephone or attendant console by dialing the required location. The transferred call is either announced or unannounced. If the transferred call is announced, the desired party/extension is notified of the impending transfer. This is typically done by putting the caller on hold and dialing the desired party/extension; they are then notified and, if they choose to accept the call, it is transferred over to them. Other terms commonly used for an announced transfer include supervised and warm transfer. On the other hand, an unannounced transfer is transferred without notifying the desired party/extension of the impending call. It is automatically transferred to their line. Other terms commonly used for an unannounced transfer include unsupervised, cold and blind transfer.

Although capable of both, the call control module 110 and the IVR module 120 typically perform unannounced transfers to facilitate the automated nature of the ACD system 100. As such, a case may occur where the IVR module 120 receives information from a caller, and based on the information, requests the call control module 110 to transfer the call to a particular call terminal for the desired party. Consequently, there is a chance that the desired party is unavailable, therefore leading to a transfer failure event. In conventional call systems, this may force the caller to redial the main number of the company, reconnect to the IVR module 120, engage in another interactive dialog with the IVR module 120, and then reconnect to the same or different party to obtain service.

The call transfer problem is sometimes addressed by keeping call control elements of the ACD system 100 in the signaling path until call transfer operations have been successfully completed. For example, the ACD system 100 may implement a back-to-back user agent (B2BUA) to act as a user agent to both ends of a SIP call. The B2BUA may track the state of the call being transferred and notify the call transferor (e.g., the party initiating the transfer) about any changes. The use of a B2BUA, however, increases the complexity of the call control operations, as well as consumes resources to monitor and track call transfer operations until completion, thereby reducing the available resources to other incoming calls. This may be particularly inefficient for applications where the ACD system 100 services a relatively large volume of incoming calls.

To solve these and other problems, the ACD system 100 may implement various transfer error recovery techniques that reduces or eliminates the need for the ACD system 100 to dedicate resources to monitor call transfer operations, such as in a B2BUA solution. Rather, the transferor can end the call leg after the call transfer action is accepted. Further, the transferee maintains full control over the call at all times. These and other advantages may be realized, for example, using the TEC component 130.

The TEC component 130 may be generally arranged to implement various transfer error recovery techniques that allow a caller and the ACD system 100 to recover in case of a transfer failure event. The TEC component 130 may record and store context information for an interactive dialog between a caller and a call system resource, such as the IVR module 120. The TEC component 130 may also generate a TEC header with TEC information, including a reference to the context information referred to as a context identifier. The TEC component 130 may then provide the TEC information to the call terminal for the caller, via the call transfer module 150, for use in automatically responding to a transfer failure event.

The TEC component 130 may be arranged to record and store context information for an interactive dialog between a caller and a call system resource, such as the IVR module 120. As used herein, the term "context information" may refer to any information regarding a state or condition of a device or system while performing a given task. In general, whenever a device or system performs a task it allocates resources and generates data that is typically unique to the task. If a task is interrupted before completion, the task may need to be started again from the beginning, thereby representing a complete loss of the work performed prior to the interruption. Recording and storing context information allows a task to be interrupted at one point in time, and resumed at a future point in time, without having to restart the entire task. Saving context information allows the device or system to reproduce the state or condition when the task has been interrupted to resume work on the task. In this case, the TEC component 130 may record and store context information for a call session prior to a call transfer operation, thereby allowing the ACD system 100 to reproduce a context for a subsequent call session in case of a transfer failure event. Examples of context information may include without limitation any information relating to call session details, clients, devices, device capabilities, communications between calling parties, call connections, call sessions, call history, previous target call terminals for call transfers, error information, caller preferences, caller rules, caller location, caller identification, biometrics, caller personal information (e.g., name, address, contact numbers, etc.), media type, media parameters, calling number priority, keywords, applications, application data, and so forth. The embodiments are not limited in this context.

The TEC component 130 may also be arranged to generate TEC information 144, with the TEC information 144 to include a context identifier for the context information. As used herein, the term "TEC information" may refer to any information suitable for allowing transfer error recovery operations in case of a transfer failure event. More specifically, the TEC information 144 may allow a call terminal for a caller to automatically reconnect to a call system resource, such as the IVR module 120, in response to a transfer failure event. Further, the TEC information 144 may include a context identifier to allow the ACD system 100 to retrieve context information from a previous call session with the caller, and generate a context for the caller on a subsequent call session to reduce or eliminate previously performed data gathering operations.

In general operation, the call control module 110 may receive an incoming call 102-1 from a first call terminal. The call control module 110 manages the call flow, and connects the incoming call 102-1 to a call system resource, such as the IVR module 120. This establishes a first call connection for a first call session between the first call terminal and the IVR module 120.

The IVR module 120 is operative to manage an interactive dialog for the first call session by sending voice prompts to the first call terminal and receiving operator commands from the first call terminal. The IVR module 120 executes an application which is tied to the number dialed DNIS. As part of the application, prerecorded audio files or dynamically generated TTS audio explains the various options available to the caller. The caller is given the choice to select options using DTMF tones or spoken words. Speech recognition is normally used to carry out more complex transactions and simplifies the application menu structure. Once the IVR module 120 gathers enough information from the caller to determine a target call terminal for a transfer, the IVR module 120 may send a transfer request to the call control module 110.

During the first call session between the first call terminal and the IVR module 120, the TEC component 130 may initiate TEC operations to generate TEC information 144. In the illustrated embodiment shown in FIG. 1, the TEC component 130 may comprise the context generator module 132 and the TEC module 142.

The context generator module 132 may be arranged to record context information 140-1-*n* for a first call session between the first call terminal and a call system resource, such as the IVR module 120. The context information 140-1-*n* may comprise, for example, the voice prompts provided to the caller, and the responses given by the caller in response to the voice prompts, among other information. The context information 140-1-*n* may further comprise information about the caller, such as caller record or profile with such caller information as an account number, priority information, caller preferences, and so forth. These and other types of context information may be used to establish a snapshot of the general context for a call session, and in particular, a point in the interactive dialog reached by the caller and the IVR module 120 prior to the IVR module 120 initiating transfer operations. The context generator module 132 may store the context information 140-1-*n* each having a corresponding context identifier 138-1-*m*, which together form a context record 136-1-*p* in the context table 133 of the context database 134.

The TEC module 142 may be arranged to generate TEC information 144 having, among other information, the context identifier 138-1-*m*. The TEC information 144 may comprise, among other information, resource identifiers to contact after a transfer error event, error codes defining a transfer error event, context identifiers for context information from previous call sessions, and so forth. The TEC module 142 may forward the TEC information 144 to the call transfer module 150.

The call transfer module 150 receives the TEC information 144, and sends the TEC information 144 to the first call terminal for use in case of a transfer failure event. As previously described, once the IVR module 120 gathers enough information from the caller to determine a target call terminal for a transfer, the IVR module 120 may send a transfer request to the call control module 110. The call control module 110 receives the transfer request from the IVR module 120. The call control module 110 may perform various call control operations in preparation of transferring the incoming call 102-1, such as doing a number lookup of the target call terminal for the transfer. The call control module 110 sends control directives to the call transfer module 150. The control directives may comprise, for example, transfer instructions to transfer the first call terminal to a second call terminal. The call transfer module 150 receives the transfer instructions from the call control module 110, the TEC information 144 from the TEC module 142, and transfers the first call terminal to a second call terminal per the transfer request.

The call transfer module 150 receives the transfer instructions from the call control module 110, the TEC information 144 from the TEC module 142, and sends a transfer message to the first call terminal. In some embodiments, the transfer message may comprise a REFER message 104-1 as defined by the SIP Refer Specification. The REFER message 104-1 may include, among other information, the TEC information 144. More particularly, the TEC information 144 may comprise a TEC header as described in more detail with reference to FIG. 2.

Figure 2:
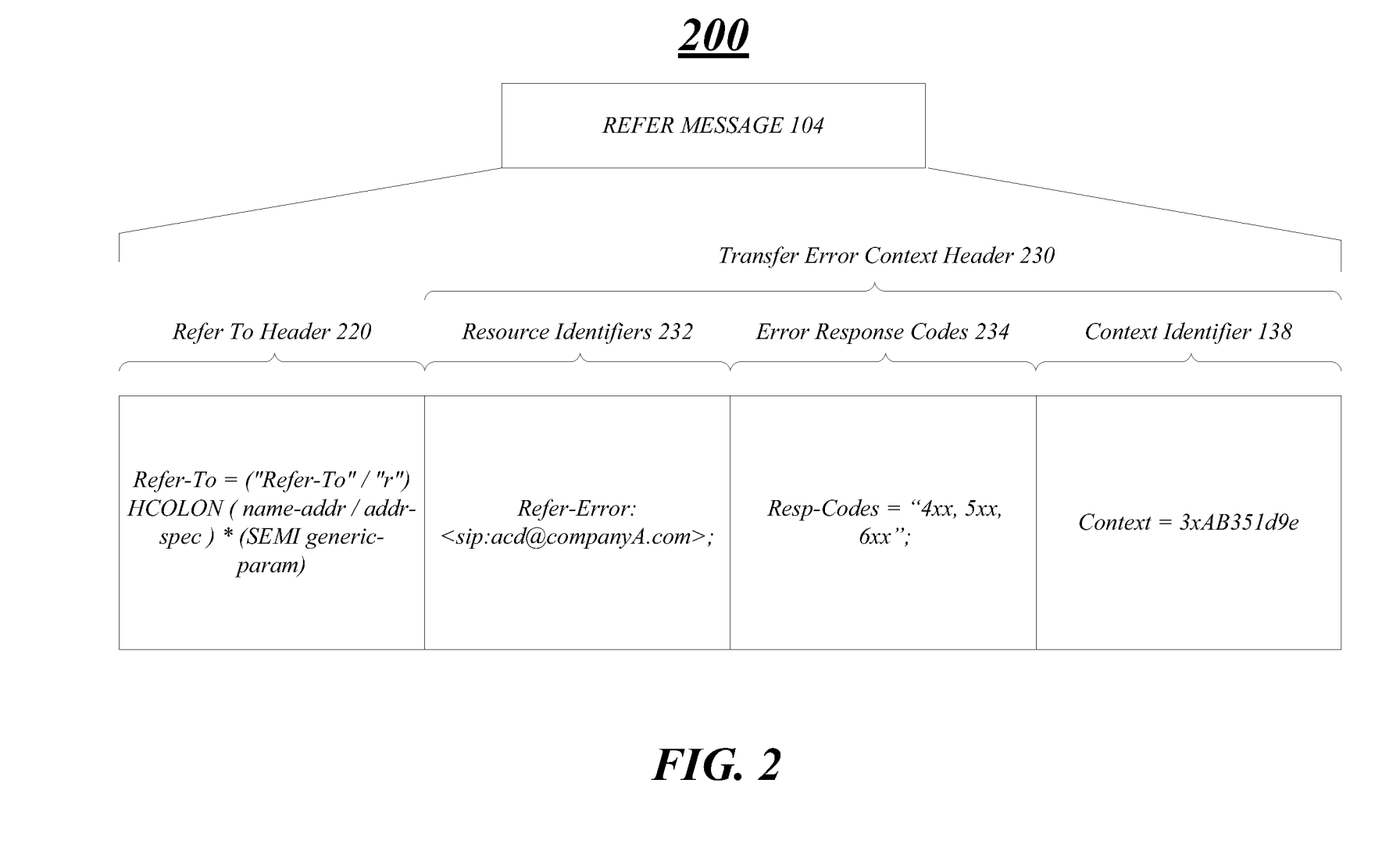
FIG. 2 illustrates one embodiment of a TEC header.

FIG. 2 illustrates one embodiment of a data structure 200. The data structure 200 may comprise, for example, a REFER message 104. The REFER message 104 may comprise a transfer mechanism to transfer calls for an automated call system, such as the ACD system 100. The REFER message 104 is a SIP method as defined by the IETF RFC 3261. The REFER message 104 indicates that the recipient, as identified by the Request-Uniform Resource Identifier (URI), should contact a third party using the contact information provided in the request. The resource identified by the Refer-To URI is contacted using the normal mechanisms for that URI type. For example, if the URI is a SIP URI indicating INVITE (using a method=INVITE URI parameter for example), the SIP UA would issue a new INVITE using all of the normal rules for sending an INVITE defined in the SIP standards.

In the illustrated embodiment shown in FIG. 2, the REFER message 104 may comprise a Refer To Header (RTH) 220. The RTH 220 is a request header (request-header) as defined by the SIP standards. It typically only appears in a REFER request. It provides a Uniform Resource Locator (URL) to reference in accordance with the following format:

Refer-To=("Refer-To"/"r")HCOLON(name-addr/
addr-spec)*(SEMI generic-param).

The URL is a URI that, in addition to identifying a resource, provides a technique for acting upon or obtaining a representation of the resource by describing its primary access mechanism or network location.

In addition to the RTH 220, the REFER message 104 may comprise a TEC header (TCH) 230. The TCH 230 may comprise a data structure for the TEC information 144. In the illustrated embodiment shown in FIG. 2, the TCH 230 may comprise one or more resource identifiers 232, one or more error response codes 234, and one or more context identifiers 138-1-*m*. The TCH 230 may include other types of information suitable for use in transfer error recovery operations, and the embodiments are not limited in this context.

The resource identifiers 232 may represent contact information for a resource or destination to forward the call to in response to a transfer failure event. The contact information may comprise any type of contact information for a resource, such as a telephone number, network address, media access control (MAC) address, electronic mail (email) address, SIP address, URI, URL, and any other unique identifier for a resource. The resource may comprise any resource suitable for handling transfer error recovery operations, including the transferor that initiated the call transfer prior to the transfer error event. For example, the resource identifiers 232 may include a SIP address for a transferor for an incoming call, such as the IVR module 120, as follows:

<sip:acd@companyA.com>

In another example, the resource identifiers 232 may include a dedicated call system resource specifically designed to handle transfer error recovery operations.

The error response codes 234 may comprise a list of configurable error cases or error codes defining a transfer error event that automatically initiates transfer error recovery operations. For example, the error response codes 234 may include various SIP error codes, as follows:

Resp-Codes="4xx,5xx,6xx"

In this example, the TCH 230 would instruct a call terminal to forward a call to acd@companyA.com for all 400, 500 and 600 class SIP error responses. The error response codes 234 are configurable by a user or the ACD system 100.

The context identifiers 138-1-*m* may comprise one or more context identifiers for context information stored in the context database 134 of the TEC component 130. The context identifiers 138-1-*m* may include any unique identifier, an example of which is as follows:

Context=3xAB251d9e

The context identifiers 138-1-*m* may be sent with a call request to initiate a subsequent call session with the ACD system 110. The ACD system 110 may use the context identifiers 138-1-*m* to retrieve context information for a previous call session with an external call terminal, and restore a context of the previous call session for the ACD system 110 for a subsequent call session with the external call terminal.

Referring again to FIG. 1, on the caller side, the first call terminal may receive the TEC information 144 in the form of the TCH 230 comprising part of the REFER message 104-1 from the call transfer module 150. The first call terminal may include logic to detect a transfer failure event, and initiate a second call session between the first call terminal and a call system resource for the ACD system 100 using the TEC information 144 contained within the TCH 230.

The ACD system 100 may receive an incoming call 102-2 to establish a second call session between the first call terminal and a call system resource, such as the IVR module 120. The context generator module 132 may receive the context identifier from the first call terminal, and retrieve the context information 140-1-$n$ corresponding to the context identifier 138-1-$m$ from the context table 133 of the context database 134. The context generator module 132 may send the context information 140-1-$n$ to the IVR module 120. Alternatively, some other element of the ACD system 100 other than the context generator module 132 may retrieve the context information 140-1-$n$, such as the IVR module 120. In this case, the context generator module 132 may need to be informed to record context information from the second call session, and update the appropriate context information 140-1-$n$.

The IVR module 120 may receive the context information 140-1-$n$, and determine a subsequent handling event for the first call terminal based on the context information 140-1-$n$. For example, the IVR module 120 may determine from the context information 140-1-$n$ that the first incoming call 102-1 from the first call terminal was unsuccessfully transferred to the second call terminal, and therefore the IVR module 120 may determine to transfer the second incoming call 102-2 from the first call terminal to another internal call terminal, such as a third call terminal.

As with the first call session, the context generator module 132 may record context information from the second call session between the first call terminal and the IVR module 120. The context generator module 132 may then update the context information 140-1-$n$ from the first call session with context information from the second call session. The context generator module 132 may store the updated context information 140-1-$n$ in the appropriate context record 136-1-$p$ having the same context identifier 138-1-$m$ as the first call session.

Figure 3:
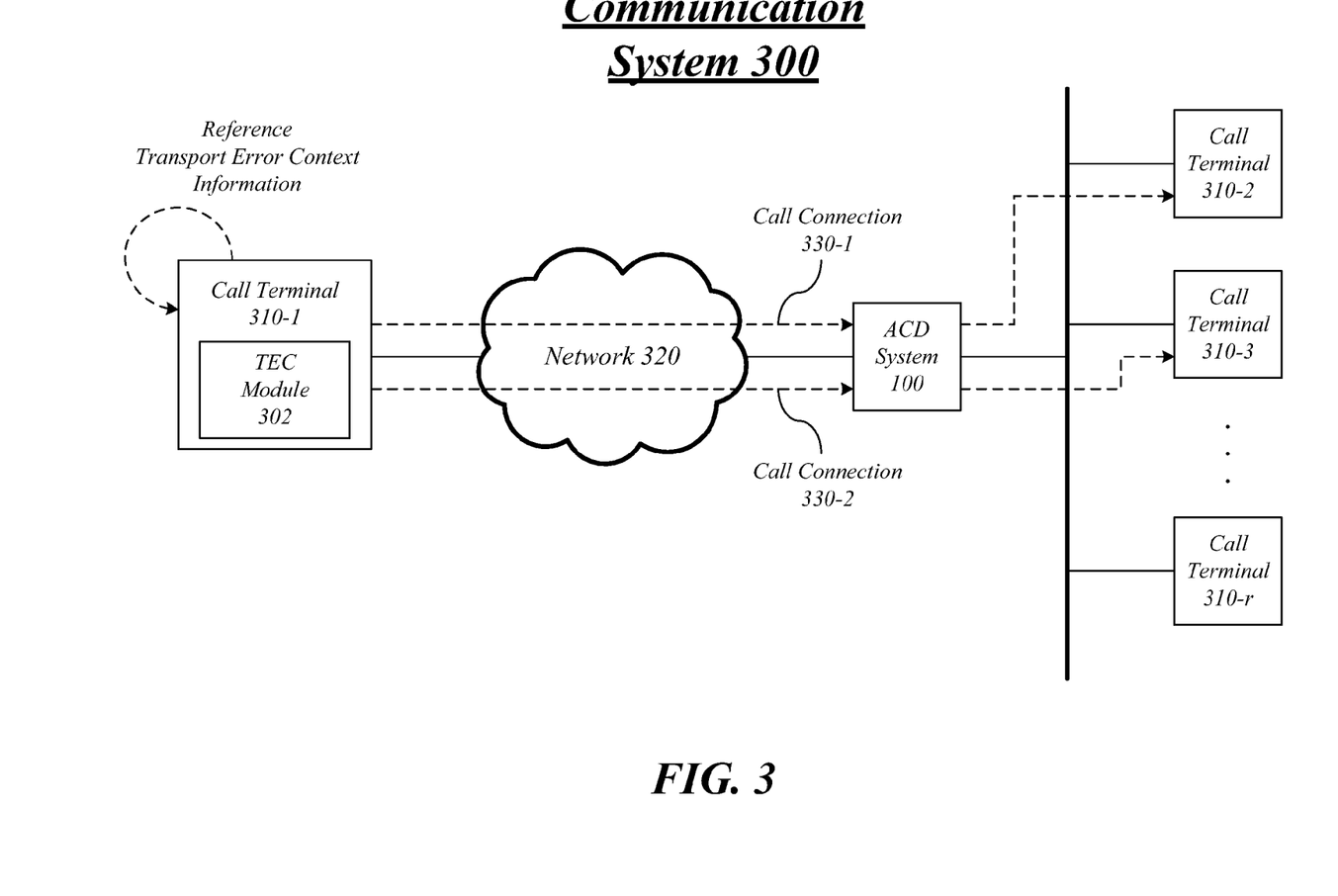
FIG. 3 illustrates one embodiment of a communication system.

FIG. 3 illustrates one embodiment of a communication system 300. In various embodiments, the communications system 300 may be implemented as a wireless communication system, a wired communication system, or a combination of both. When implemented as a wireless communication system, communications system 300 may include components and interfaces suitable for communicating over wireless communications media, such as one or more antennas, transmitters, receivers, transceivers, amplifiers, filters, control logic, and so forth. An example of the communications media may include a wireless shared media implemented using portions of a wireless spectrum, such as the radio-frequency (RF) spectrum and so forth. When implemented as a wired communications system, communications system 300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

As shown in FIG. 3, the communication system 300 may include multiple call terminals 310-1-$r$. The call terminals 310-1-$r$ may comprise any physical or logical communication device capable of establishing a VoIP call connection with the ACD system 100 via the packet-switched network 320. Examples of the call terminals 310-1-$r$ may include without limitation a digital telephone, a packet telephone, a VoIP telephone, a cellular telephone with data communications capabilities, a computer, a personal computer, a laptop computer, a handheld computer, a mobile computer, a server, a workstation, an appliance, a network appliance, and so forth. In one embodiment, for example, the call terminals 310-1-$r$ may be implemented as VoIP call terminals implemented as SIP user agents. The embodiments, however, are not limited in this context.

The first call terminal 310-1 may represent an external call terminal, while the call terminals 310-2-$r$ may represent internal call terminals serviced by the ACD system 100. The first call terminal 310-1 may initiate a first call connection 330-1 with the ACD system 100 via a packet-switched network 320. An example of the packet-switched network 320 may comprise the Internet. Through an interactive dialog with a caller for the first call terminal 310-1, the ACD system 100 may determine to transfer the call connection 330-1 to a second call terminal 310-2, notifies the first call terminal 310-1 accordingly via a REFER message 104 with the TCH 230, and releases the call connection 330-1.

Assuming the call transfer fails, a TEC module 302 for the first call terminal 310-1 detects the transfer error event, and references the TEC information 144 from the TCH 230. The TEC module 302 may perform client-side transfer call recovery operations utilizing the TEC information 144. For example, the TEC module 302 may automatically establish a call connection with the ACD system 100 using the resource identifiers 232 of the TCH 230 of the REFER message 104-1. In another example, the TEC module 302 may present a list of user options, such as connect to the ACD system 100, connect to a different number within a company, terminate transfer error recovery operations, and so forth. This may provide the transferee the possibility of programmatically selecting the desired option for handling a transfer failure event.

Since the first call connection 330-1 has been previously released, the first call terminal 310-1 initiates a second call connection 330-2 with the ACD system 100, and sends the context identifier 138-1-$m$ to the ACD system 100. The TEC component 130 of the ACD system 100 receives the context identifier 138-1-$m$, retrieves corresponding context information 140-1-$n$, and builds a context of the first call session communicated over the first call connection 330-1 for the second call session communicated over the second call connection 330-2. Based on the reconstructed context, the ACD system 100 may determine to transfer the first call terminal 310-1 to a third call terminal 310-3, notifies the first call terminal 310-1 accordingly via a REFER message 104 with the TCH 230, and releases the call connection 330-2. These transfer error recovery operations may continue through any number of cycles until the first call terminal 310-1 is successfully connected to an internal call terminal 310-1-$r$ without a transfer failure event occurring.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 4:
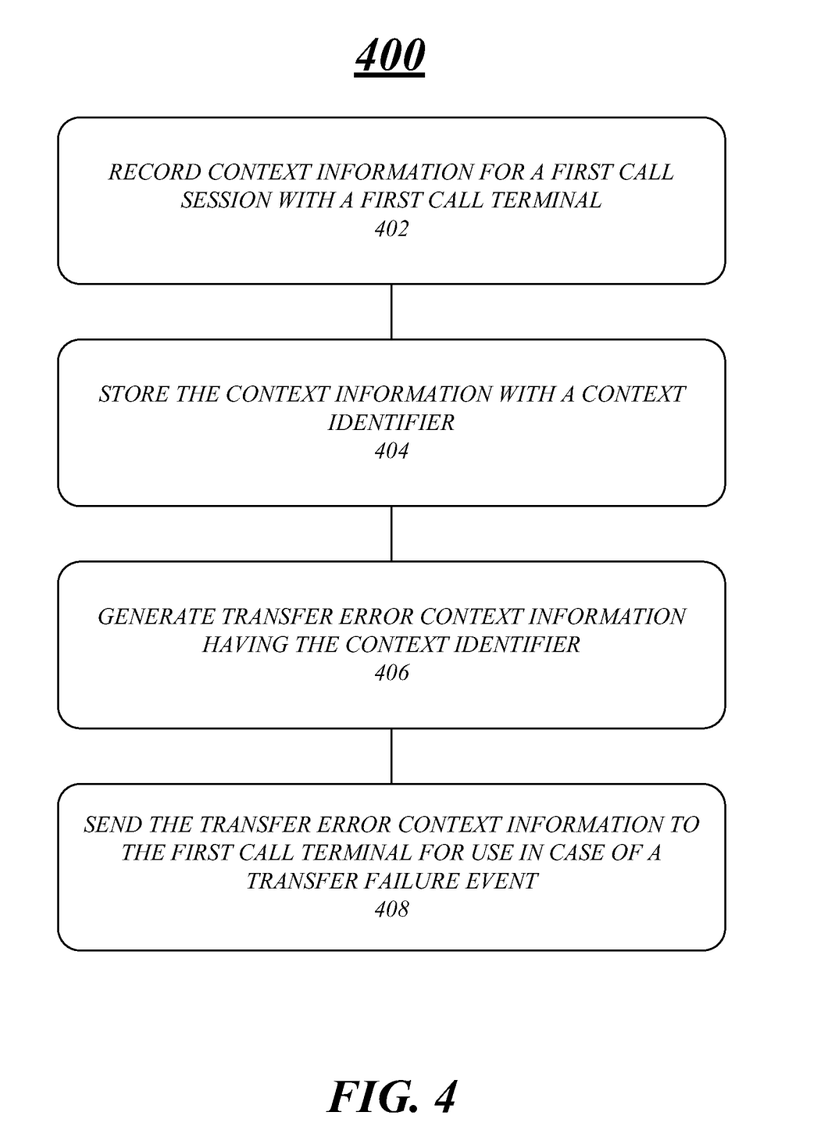
FIG. 4 illustrates one embodiment of a logic flow.

FIG. 4 illustrates a block flow diagram for a logic flow 400. The logic flow 400 may be representative of some or all of the operations executed by one or more embodiments described herein.

The logic flow 400 may record context information for a first call session with a first call terminal at block 402. For example, the context generator module 132 of the TEC component 130 may detect or be notified of the incoming call 102-1 from the first call terminal 310-1, and initiate recording operations to record context information 140-1-$n$ for the first call session between the first call terminal 310-1 and the IVR module 120.

The logic flow 400 may store the context information with a context identifier at block 404. For example, the context generator module 132 of the TEC component 130 may store the context information 140-1-$n$ recorded from the first call session with the first call terminal 310-1 using a unique context identifier 138-1-$m$. The context identifier 138-1-$m$ may be used to retrieve the context information 140-1-$n$ for future or subsequent call sessions with the first call terminal 310-1.

The logic flow 400 may generate transfer error context information having the context identifier at block 406. For example, the TEC module 142 may generate the TCH 230. The TEC module 142 may receive the context identifier 138-1-$m$ directly from the context generator module 132, or indirectly via the context database 134, and include the context identifier 138-1-$m$ in the TCH 230. The TEC module 142 may send the TCH 230 to the call transfer module 150.

The logic flow 400 may send the transfer error context information to the first call terminal for use in case of a transfer failure event at block 408. For example, the call transfer module 150 may receive transfer instructions from the call control module 110, and the TCH from the TEC module 142, and generate the REFER message 104-1. The call transfer module 150 may send the REFER message 104-1 to the first call terminal 310-1, and release the call connection for the incoming call 102-1.

Figure 5A:
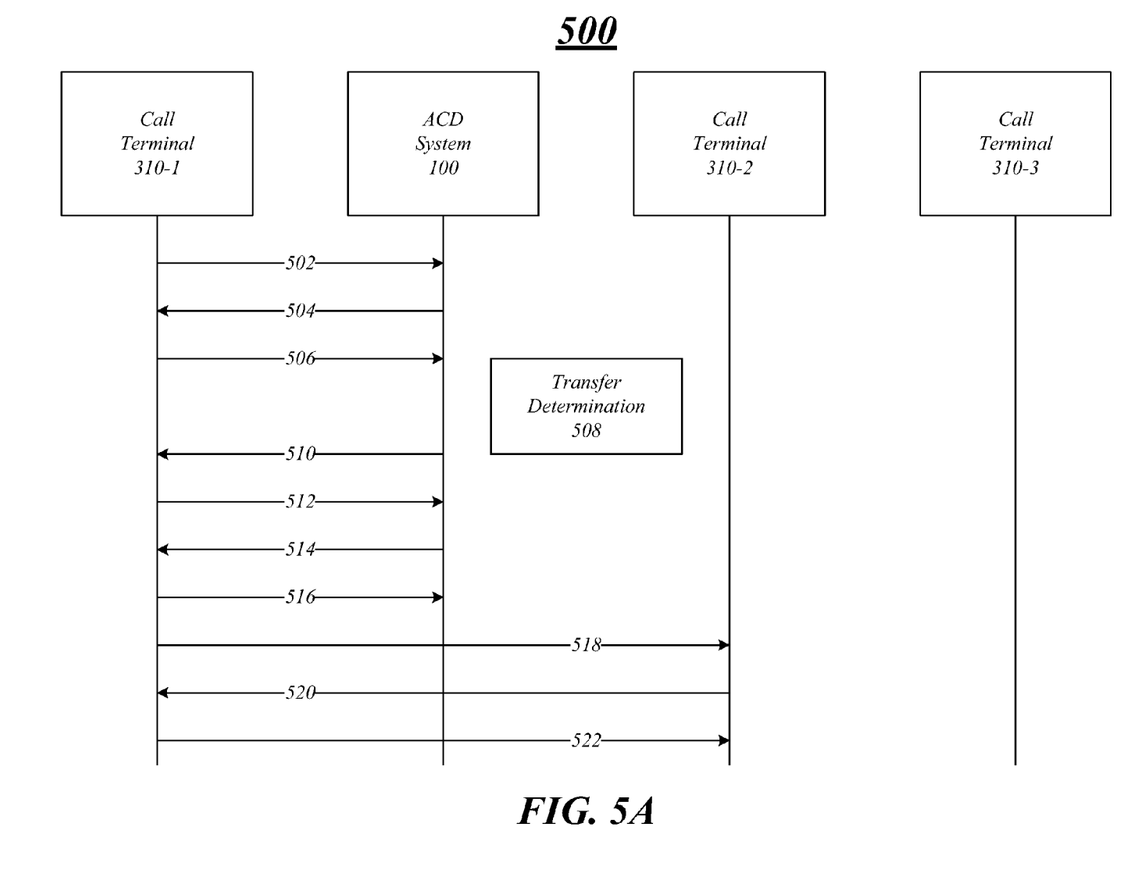
FIG. 5A illustrates one embodiment of a first message flow.

FIG. 5A illustrates one embodiment of a first message flow 500. The message flow 500 may represent a message flow between the various elements of the communications system 300. As shown in FIG. 5A, assume a caller Alice calls a main number for Company A and the ACD system 100 of Company A accepts the call. Alice may use the call terminal 310-1 to initiate a first call connection 330-1 with the ACD system 100 via a packet-switched network 320 by sending an INVITE message (e.g., main-number@companyA.com) as indicated by arrow 502. The ACD system 100 receives the INVITE message, and sends a 200 OK message to the call terminal 310-1 as indicated by arrow 504. The call terminal 310-1 sends an ACK message as indicated by arrow 506, and the first call connection 330-1 is established. An endpoint for the call connection 330-1 may comprise the IVR module 120 of the ACD system 100.

Through an interactive dialog with a caller for the first call terminal 310-1, the IVR module 120 makes a transfer determination at block 508 to transfer the call connection 330-1 to Bob at a second call terminal 310-2. The ACD system 100 notifies the first call terminal 310-1 accordingly by sending a REFER message 104-1 to the first call terminal 310-1 as indicated by arrow 510. The REFER message may include the RTH 220 with a resource identifier for the call terminal 310-2 and the TCH 230. The call terminal 310-1 sends a 202 ACCEPTED message to the ACD system 100 as indicated by arrow 512. The ACD system 100 releases the call connection 330-1 by sending a BYE message to the call terminal 310-1 as indicated by arrow 514. The call terminal 310-1 acknowledges the call release by sending a 200 OK message to the ACD system 100 as indicated by arrow 516.

The call terminal 310-1 initiates a new call with the call terminal 310-2 by sending an INVITE message (e.g., bob@companyA.com) as indicated by arrow 518. Assume Bob is currently on a telephone call using the call terminal 310-2. In this case, the call terminal 310-2 sends a 486 BUSY message to the call terminal 310-1 as indicated by arrow 520. The call terminal 310-1 receives the 486 BUSY message, and the TEC module 302 of the call terminal 310-1 compares the 486 BUSY code with the error codes from the TCH 230. If there is a match, the call terminal 310-1 detects a transfer failure event with Bob at the call terminal 310-2. The call terminal 310-1 sends an ACK message to the call terminal 310-2 as indicated by arrow 522.

Figure 5B:
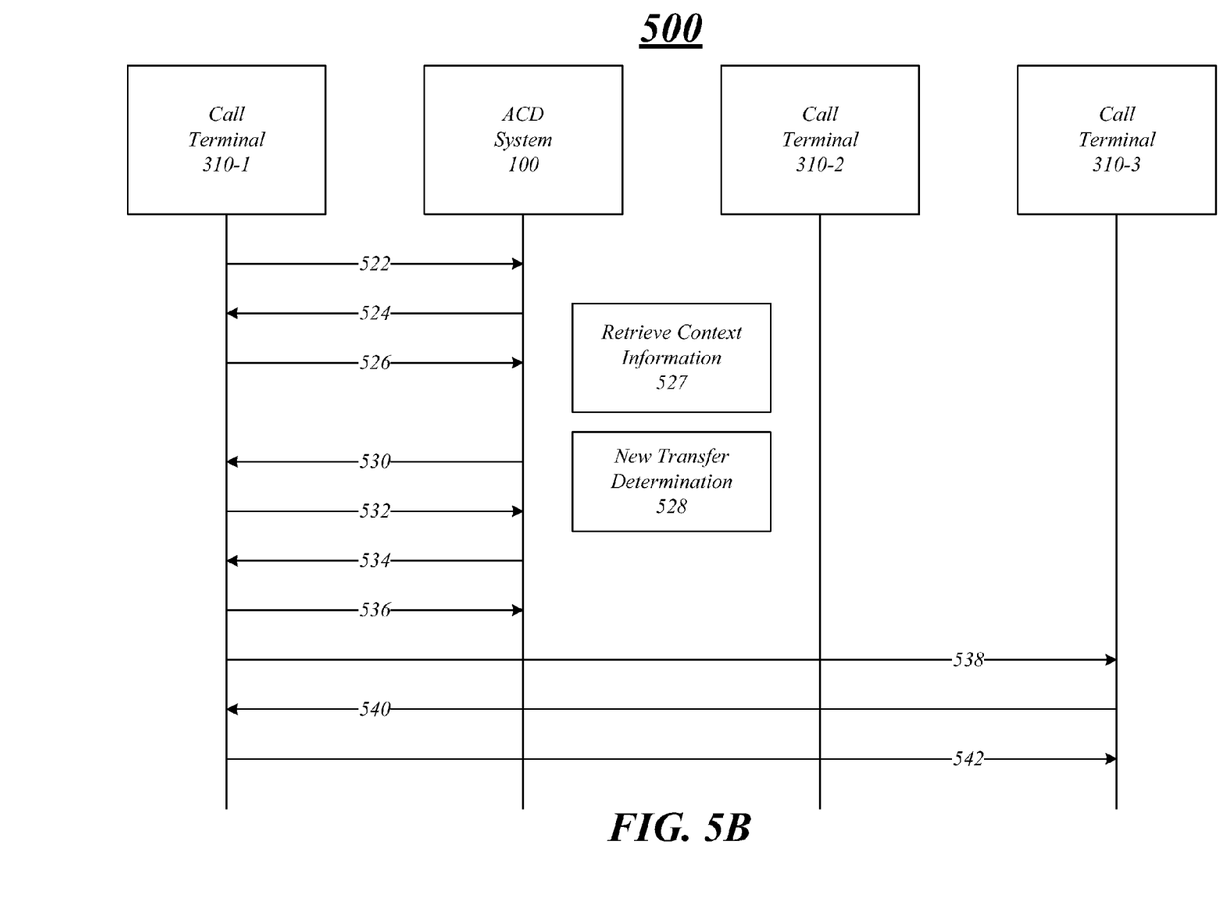
FIG. 5B illustrates one embodiment of a second message flow.

FIG. 5B illustrates a continuation of the message flow 500. As shown in FIG. 5B, since the error code 486 is part of the error response codes 234, the call terminal 310-1 automatically initiates a second call connection 330-2 with the ACD system 100 by sending another INVITE message (e.g., main-number@companyA.com) with the context identifier 138-1-$m$ to the ACD system 100 as indicated by arrow 522. The ACD system 100 sends a 200 OK message to the call terminal 310-1 as indicated by arrow 524. The call terminal 310-1 sends an ACK message to the ACD system 100 as indicated by arrow 526. The ACD system 100 retrieves the context information at block 527. The retrieved context information may restore the original call context for the first call session over the call connection 330-1, such as the position in the DTMF based menu provided by the IVR module 120, thereby allowing Alice to avoid having to start the interactive dialog with the IVR module 120 from the beginning of the automated script. The IVR module 120 of the ACD system 100 then makes a new determination at block 528 to transfer the call connection 330-2 to Mary at the third call terminal 310-3 based on the retrieved context information at block 528.

As with the message flow 500 shown in FIG. 5A, the ACD system 100 notifies Alice of the transfer to Mary at the target call terminal 310-3 and releases the call connection 330-2. This may be accomplished using messages described with reference to arrows 530, 532, 534 and 536 that are similar to the messages described with reference to respective arrows 510, 512, 514 and 516. A notable difference is that a REFER message 104-2 is sent that contains a RTH 220 with a resource identifier for the call terminal 310-3 rather than the call terminal 310-2, and the TCH 230 includes the updated context identifier 138-1-$m$.

The call terminal 310-1 initiates a new call with the call terminal 310-3 by sending an INVITE message (e.g., mary@companyA.com) as indicated by arrow 538. Assume Mary is available and answers the call. The call terminal 310-3 receives the INVITE message, and sends a 200 OK message to the call terminal 310-1 as indicated by arrow 540. The call terminal 310-1 sends an ACK message as indicated by arrow 542, and a call connection 330-3 is established between the call terminals 310-1, 310-3 of Alice and Mary.

Once a call transfer has been successfully completed, the ACD system 100 and the call terminal 310-1 may perform routine records maintenance by deleting the context information 144 to make room for context information from other callers or other call sessions.

In an alternative embodiment, the ACD system 100 may generate TEC information 144 in a manner that avoids the need for the first call terminal 310-1 to re-establish a call connection with the ACD system 100 in response to a transfer failure event. For example, the TEC module 142 may generate a TCH 230 with a resource identifier 232 of another target call terminal rather than the ACD system 100. During the first call session, the IVR module 120 may determine multiple target call terminals 310-2, 310-3 to transfer the call terminal 310-1 for handling. The TEC module 142 may then generate a TCH 230 with a resource identifier 232 for the call terminal 310-3 rather than the ACD system 100. The TEC module 302 may connect directly to the call terminal 310-3 in response to a transfer failure event, thereby avoiding the need to call the ACD system 100.

FIGS. 5A and 5B illustrate the message flow 500 for an unattended transfer case. In some embodiments, however, the ACD system 100 may be arranged to perform an attended transfer between Alice and Bob. In this case, the ACD system 100 establishes a connection with Bob at the call terminal 310-2 prior to the message exchange indicated by arrows 510, 512, 514 and 516, before connecting the call terminal 310-1 used by Alice to the call terminal 310-2 used by Bob.

Figure 6:
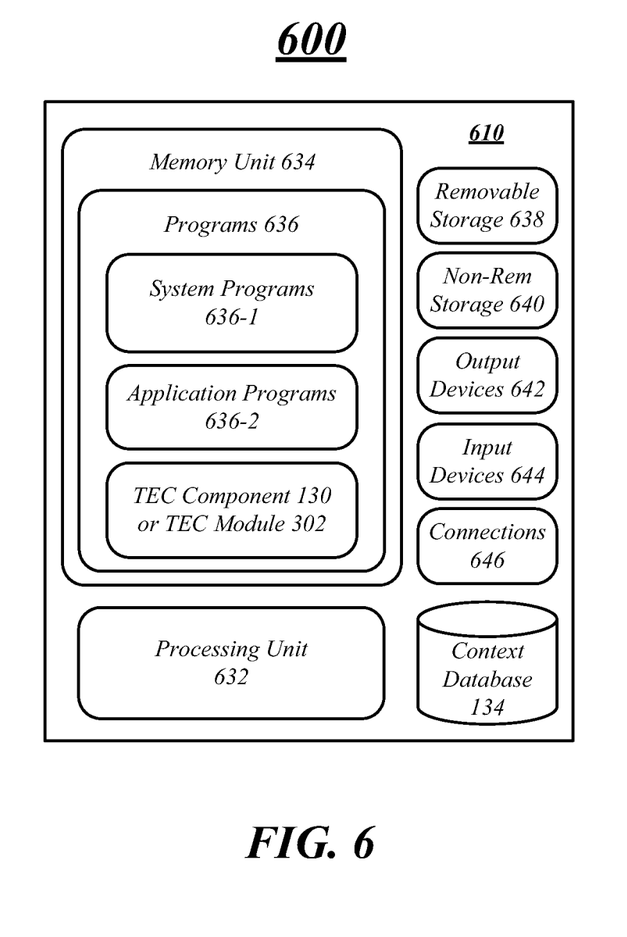
FIG. 6 illustrates one embodiment of a computing system architecture.

FIG. 6 further illustrates a block diagram of a computing system architecture 610. Computing system architecture 610 may be representative of a computing architecture suitable for implementing some or all of the embodiments. In a basic configuration, computing system architecture 610 typically includes at least one processing unit 632 and memory 634. Memory 634 may be implemented using any machine-readable or computer-readable media capable of storing data, including both volatile and non-volatile memory. For example, memory 634 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. As shown in FIG. 6, memory 634 may store various software programs, such as one or more application programs 636-1-s and accompanying data.

Computing system architecture 610 may also have additional features and/or functionality beyond its basic configuration. For example, computing system architecture 610 may include removable storage 638 and non-removable storage 640, which may also comprise various types of machine-readable or computer-readable media as previously described. Computing system architecture 610 may also have one or more input devices 644 such as a keyboard, mouse, pen, voice input device, touch input device, measurement devices, sensors, and so forth. Computing system architecture 610 may also include one or more output devices 642, such as displays, speakers, printers, and so forth. Computing system architecture 610 may further include one or more communications connections 646 that allow computing system architecture 610 to communicate with other devices. Communications connections 646 may include various types of standard communication elements, such as one or more communications interfaces, network interfaces, network interface cards (NIC), radios, wireless transmitters/receivers (transceivers), wired and/or wireless communication media, physical connectors, and so forth. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. The terms machine-readable media and computer-readable media as used herein are meant to include both storage media and communications media.

Figure 7:
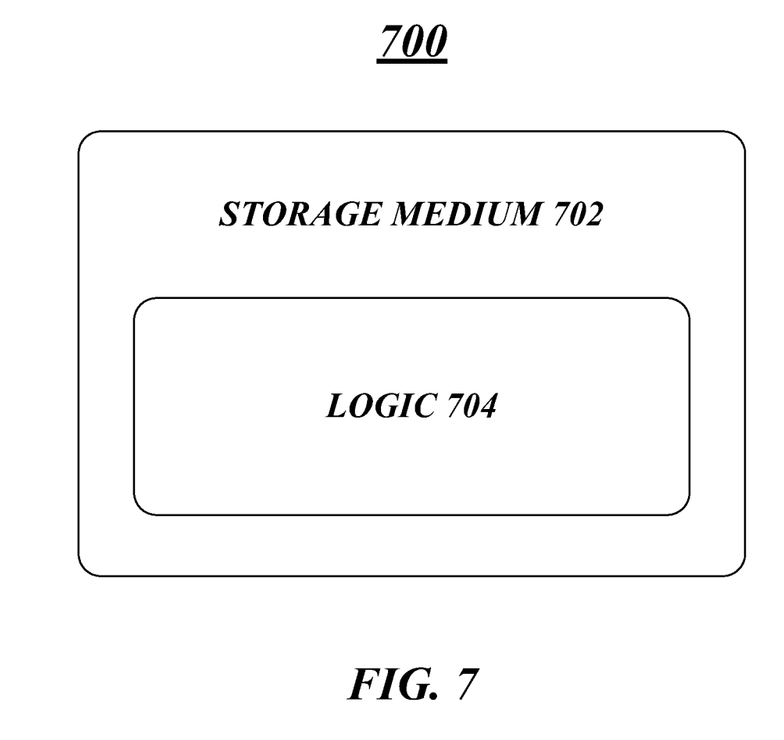
FIG. 7 illustrates one embodiment of an article of manufacture.

FIG. 7 illustrates a diagram an article of manufacture 700 suitable for storing logic for the various embodiments, including the logic flow 400. As shown, the article 700 may comprise a storage medium 702 to store logic 704. Examples of the storage medium 702 may include one or more types of computer-readable storage media capable of storing electronic data, including volatile memory or non-volatile memory, removable or non-removable memory, erasable or non-erasable memory, writeable or re-writeable memory, and so forth. Examples of the logic 704 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article 700 and/or the computer-readable storage medium 702 may store logic 704 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    recording context information for a first call session between a first call terminal and a caller;
    storing the context information with a context identifier;
    generating transfer error context information having the context identifier, a transfer error context header with a resource identifier of a resource to transfer the first call session to in the event of a transfer failure event, and a set of error codes, wherein an error code defines a transfer failure event that automatically initiates a transfer failure recovery operation;
    sending the transfer error context information to the first call terminal;
    attempting to transfer the call session to a second call terminal;
    receiving a code indicating that the transfer did not occur;
    comparing the code to the set of error codes in the transfer error context header; and
    automatically initiating a second call session with the resource identified by the resource identifier when the code matches a code in the set of error codes.

2. The method of claim 1, wherein the resource identifier comprises contact information for a resource.

3. The method of claim 1, wherein the resource identified by the resource identifier is one of: a dedicated call system resource for handling transfer recovery operations; a different call terminal; a plurality of call terminals; and an automatic call distributor system.

4. The method of claim 1, wherein the error response codes comprise a list of configurable error codes.

5. The method of claim 1, wherein the error response codes are session initiation protocol (SIP) error codes.

6. The method of claim 1, comprising:
    sending the context identifier when automatically initiating the second call session to the resource identified by the resource identifier.

7. The method of claim 1, comprising:
    deleting the context information when the transfer to the resource is successfully completed.

8. An article comprising a storage medium containing instructions that when executed cause a system to:
    record context information for a first call session between a first call terminal and a caller;
    store the context information with a context identifier;
    generate transfer error context information having the context identifier, a transfer error context header with a resource identifier of a resource to transfer the first call session to in the event of a transfer failure event, and a set of error codes, wherein an error code defines a transfer failure event that automatically initiates a transfer failure recovery operation;
    send the transfer error context information to the first call terminal;
    attempt to transfer the call session to a second call terminal;
    receive a code indicating that the transfer did not occur;
    compare the code to the set of error codes in the transfer error context header; and
    automatically initiate a second call session with the resource identified by the resource identifier when the code matches a code in the set of error codes.

9. The article of claim 8, wherein the resource identifier comprises contact information for a resource.

10. The article of claim 8, wherein the resource identified by the resource identifier is one of: a dedicated call system resource for handling transfer recovery operations; a different call terminal; a plurality of call terminals; and an automatic call distributor system.

11. The article of claim 8, wherein the error response codes comprise a list of configurable error codes.

12. The article of claim 8, wherein the error response codes are session initiation protocol (SIP) error codes.

13. The article of claim 8, further comprising instructions that when executed cause the system to: delete the context information when the transfer to the resource is successfully completed.

14. A system, comprising:
    a processor;
    a context generator module executing on the processor to record context information for a first call session between a first call terminal and a call system resource, and store the context information with a context identifier;
    a transfer error context module to couple to the context generator module, the transfer error context module operative to generate transfer error context information having the context identifier, a transfer error context header with a resource identifier of a resource to transfer the first call session to in the event of a transfer failure event, and a set of error codes, wherein an error code defines a transfer failure event that automatically initiates a transfer failure recovery operation, and operative to compare a code received when a transfer does not occur to the set of error codes; and a call transfer module to couple to the transfer error context module, the call transfer module operative to send the transfer error context information to the first call terminal, to receive transfer instructions to transfer the first call session to a second call terminal, to receive a code indicating that the transfer did not occur, and to initiate a second call session with the resource identified by the resource identifier when the transfer error context module indicates that the code matches a code in the set of error codes.

15. The system of claim 14, wherein the resource identifier comprises contact information for a resource.

16. The system of claim 14, wherein the resource identified by the resource identifier is one of: a dedicated call system resource for handling transfer recovery operations; a different call terminal; a plurality of call terminals; and an automatic call distributor system.

17. The system of claim 14, wherein the error response codes comprise a list of configurable error codes.

18. The system of claim 14, wherein the error response codes are session initiation protocol (SIP) error codes.

19. The system of claim 14, the call transfer module operative to send the context identifier when automatically initiating the second call session to the resource identified by the resource identifier.

20. The system of claim 14, the context generator module operative to delete the context information when the transfer to the resource is successfully completed.

* * * * *